United States Patent
Yoo et al.

(10) Patent No.: US 12,176,569 B2
(45) Date of Patent: Dec. 24, 2024

(54) BATTERY MODULE, AND BATTERY RACK AND POWER STORAGE DEVICE COMPRISING BATTERY MODULE

(71) Applicant: LG ENERGY SOLUTION, LTD., Seoul (KR)

(72) Inventors: Jae-Min Yoo, Daejeon (KR); Eun-Gyu Shin, Daejeon (KR); Sang-Hyun Jo, Daejeon (KR); Jeong-O Mun, Daejeon (KR); Yoon-Koo Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 665 days.

(21) Appl. No.: 17/424,993

(22) PCT Filed: Oct. 19, 2020

(86) PCT No.: PCT/KR2020/014263
§ 371 (c)(1),
(2) Date: Jul. 22, 2021

(87) PCT Pub. No.: WO2021/085911
PCT Pub. Date: May 6, 2021

(65) Prior Publication Data
US 2022/0123429 A1 Apr. 21, 2022

(30) Foreign Application Priority Data
Oct. 30, 2019 (KR) .................. 10-2019-0136958

(51) Int. Cl.
*H01M 50/375* (2021.01)
*H01M 10/613* (2014.01)
(Continued)

(52) U.S. Cl.
CPC ....... *H01M 50/375* (2021.01); *H01M 10/613* (2015.04); *H01M 10/6556* (2015.04);
(Continued)

(58) Field of Classification Search
CPC ............ H01M 50/375; H01M 10/613; H01M 10/6556; H01M 50/209; H01M 50/342; H01M 2200/10; H01M 50/02
See application file for complete search history.

(56) References Cited

U.S. PATENT DOCUMENTS

| 10,658,636 B2 * | 5/2020 | Geshi ............... H01M 10/6566 |
| 2006/0088758 A1 | 4/2006 | Wu |

(Continued)

FOREIGN PATENT DOCUMENTS

| CN | 1790803 A | 6/2006 |
| CN | 1812182 A | 8/2008 |

(Continued)

OTHER PUBLICATIONS

Extended European Search Report for European Application No. 20880582.0, dated Jul. 6, 2022.
(Continued)

*Primary Examiner* — Matthew T Martin
*Assistant Examiner* — Bartholomew A Hornsby
(74) *Attorney, Agent, or Firm* — Birch, Stewart, Kolasch & Birch, LLP (57) ABSTRACT

A battery module includes battery cells; a module case configured to accommodate the battery cells and having an internal cooling channel provided at both sides of the plurality of battery cells; a venting opening provided at both side surfaces of the module case; a sheet member mounted to both side surfaces of the module case to cover the venting opening and melted over a predetermined temperature to open the venting opening; and a blocking bracket spaced apart from the sheet member by a predetermined distance and mounted to inner walls at both sides of the module case.

17 Claims, 8 Drawing Sheets

(51) Int. Cl.
*H01M 10/6556* (2014.01)
*H01M 50/209* (2021.01)
*H01M 50/342* (2021.01)

(52) U.S. Cl.
CPC ....... *H01M 50/209* (2021.01); *H01M 50/342* (2021.01); *H01M 2200/10* (2013.01)

(56) References Cited

U.S. PATENT DOCUMENTS

| | | | |
|---|---|---|---|
| 2006/0091856 A1 | 5/2006 | Lee et al. | |
| 2006/0093801 A1 | 5/2006 | Lee et al. | |
| 2008/0220321 A1* | 9/2008 | Yonemochi | H01M 50/213 |
| | | | 429/185 |
| 2015/0004449 A1 | 1/2015 | Lim et al. | |
| 2015/0147605 A1 | 5/2015 | Kim et al. | |
| 2016/0020447 A1 | 1/2016 | Janarthanam et al. | |
| 2016/0093842 A1* | 3/2016 | Blanco | H01M 50/394 |
| | | | 429/50 |
| 2016/0133900 A1* | 5/2016 | Li | H01M 10/0525 |
| | | | 429/56 |
| 2016/0181675 A1 | 6/2016 | Inoue et al. | |
| 2016/0248131 A1 | 8/2016 | Cano-Ramirez | |
| 2016/0254578 A1 | 9/2016 | Liu et al. | |
| 2017/0309979 A1* | 10/2017 | Lee | H01M 10/6566 |
| 2018/0159098 A1 | 6/2018 | Ling et al. | |
| 2018/0241017 A1* | 8/2018 | Nakamura | H01M 50/202 |
| 2019/0326571 A1 | 10/2019 | Wuensche et al. | |
| 2020/0136111 A1 | 4/2020 | Jiang et al. | |

FOREIGN PATENT DOCUMENTS

| | | | |
|---|---|---|---|
| CN | 104319360 A | 1/2015 | |
| CN | 105473382 A | 4/2016 | |
| CN | 105810859 A | 7/2016 | |
| CN | 107665964 A | 2/2018 | |
| CN | 108352472 A | 7/2018 | |
| CN | 209000982 U | 6/2019 | |
| EP | 3 333 934 A1 | 6/2018 | |
| JP | 2008-226518 A | 9/2008 | |
| JP | 2013-89289 A | 5/2013 | |
| JP | 2014-107178 A | 6/2014 | |
| JP | 2015-41605 A | 3/2015 | |
| JP | 2016-189317 A | 11/2016 | |
| JP | 2017-37755 A | 2/2017 | |
| JP | 2017-526111 A | 9/2017 | |
| JP | 2018-32496 A | 3/2018 | |
| JP | 2018-512700 A | 5/2018 | |
| JP | 6507921 B2 | 5/2019 | |
| KR | 10-2005-0018269 A | 2/2005 | |
| KR | 10-2006-0045458 A | 5/2006 | |
| KR | 10-2012-0015900 A | 2/2012 | |
| KR | 10-2015-0061200 A | 6/2015 | |
| KR | 10-1567632 B1 | 11/2015 | |
| KR | 10-2016-0123852 A | 10/2016 | |
| KR | 10-2018-0088278 A | 8/2018 | |
| KR | 10-2019-0012461 A | 2/2019 | |
| WO | 2019/008899 A1 | 1/2019 | |

OTHER PUBLICATIONS

International Search Report (PCT/ISA/210) issued in PCT/KR2020/014263 mailed on Feb. 3, 2021.

* cited by examiner

BATTERY MODULE, AND BATTERY RACK AND POWER STORAGE DEVICE COMPRISING BATTERY MODULE

TECHNICAL FIELD

The present disclosure relates to a battery module, and a battery rack and an energy storage system including the battery module.

The present application claims priority to Korean Patent Application No. 10-2019-0136958 filed on Oct. 30, 2019 in the Republic of Korea, the disclosures of which are incorporated herein by reference.

BACKGROUND ART

Secondary batteries which are highly applicable to various products and exhibit superior electrical properties such as high energy density, etc. are commonly used not only in portable devices but also in electric vehicles (EVs) or hybrid electric vehicles (HEVs) driven by electrical power sources. The secondary battery is drawing attentions as a new energy source for enhancing environment friendliness and energy efficiency in that the use of fossil fuels can be reduced greatly and no byproduct is generated during energy consumption.

Secondary batteries widely used at present include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.5V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

Meanwhile, when a plurality of battery cells are connected in series or in parallel to configure a battery pack, it is common to configure a battery module including at least one battery cell first, and then configure a battery pack or a battery rack by using at least one battery module and adding other components.

The conventional battery module may include a cooling unit of a water-cooling type or an air-cooling type for cooling the battery module. Here, the cooling unit of the battery module having an air-cooling structure generally includes a cooling air supply unit and a cooling air discharge unit. Meanwhile, when a high-temperature situation occurs due to abnormal heating of at least one of the battery cells, high-temperature gas and flame may be generated inside the battery module.

However, the conventional battery module having an air-cooling structure has a problem in that high-temperature gas does not smoothly escape from the battery module. In this case, thermal runaway of any one battery cell inside the module may propagates to adjacent battery cells inside the module, which may lead to explosion of the entire battery module and thus cause great damage.

In addition, when a flame is generated inside the conventional battery module having an air-cooling structure, if the internal flame is leaked to the outside, the risk of a fire transfer to surrounding battery modules increases.

Therefore, it is requested to find a way to quickly discharge high-temperature gas and prevent internal flame from being leaked to the outside when the high-temperature gas and the internal flame are generated in the battery module having an air-cooling structure due to abnormal heating of at least one battery cell inside the module.

DISCLOSURE

Technical Problem

The present disclosure is directed to providing a battery module, which may quickly discharge high-temperature gas to the outside when the high-temperature gas is generated in a module case due to abnormal heating of at least one battery cell, and providing a battery rack and an energy storage system including the battery module.

In addition, the present disclosure is directed to providing a battery module, which may prevent internal flame from being leaked to the outside when the flame is generated in the module case due to abnormal heating of at least one battery cell, and providing a battery rack and an energy storage system including the battery module.

Technical Solution

In one aspect of the present disclosure, there is provided a battery module, comprising: a plurality of battery cells; a module case configured to accommodate the plurality of battery cells and having two sidewalls and an internal cooling channel provided at each side of the plurality of battery cells; at least one opening provided in each of the two sidewalls of the module case; a sheet member mounted to each of the two sidewalls of the module case to cover the at least one venting opening and melted over a predetermined temperature to open the at least one venting opening; and a blocking bracket spaced apart from the sheet member by a predetermined distance and mounted to an inner surface of each of the two sidewalls of the module case.

The at least one venting opening is a plurality of vent openings, and the plurality of venting openings may be disposed to be spaced apart from each other by a predetermined distance along a longitudinal direction of the module case.

The sheet member may be provided to have a predetermined length along the longitudinal direction of the module case and to have a size for covering the plurality of venting openings in each of the two sidewalls of the module case.

The venting opening may be provided as a mesh.

The blocking bracket may include a bracket base mounted to the inner surface of each of the two sidewalls of the module case; and a bracket block configured to extend from the bracket base and spaced apart from the at least one venting opening by a predetermined distance.

The bracket block may be provided to have a size for covering the at least one venting opening.

The bracket block may be disposed to face the plurality of battery cells.

The sheet member may be mounted to the inner surface of each of the two sidewalls of the module case.

In addition, the present disclosure further provides a battery rack, comprising: at least one battery module according to the above embodiments; and a rack case configured to accommodate the at least one battery module.

Moreover, the present disclosure further provides an energy storage system, comprising at least one battery rack according to the above embodiments.

Advantageous Effects

According to various embodiments as above, it is possible to provide a battery module, which may quickly discharge high-temperature gas to the outside when the high-temperature gas is generated in a module case due to abnormal heating of at least one battery cell, and to provide a battery rack and an energy storage system including the battery module.

In addition, according to various embodiments as above, it is possible to provide a battery module, which may prevent internal flame from being leaked to the outside when the flame is generated in the module case due to abnormal heating of at least one battery cell, and to provide a battery rack and an energy storage system including the battery module.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but the dimensions of some components may be exaggerated.

Figure 1:
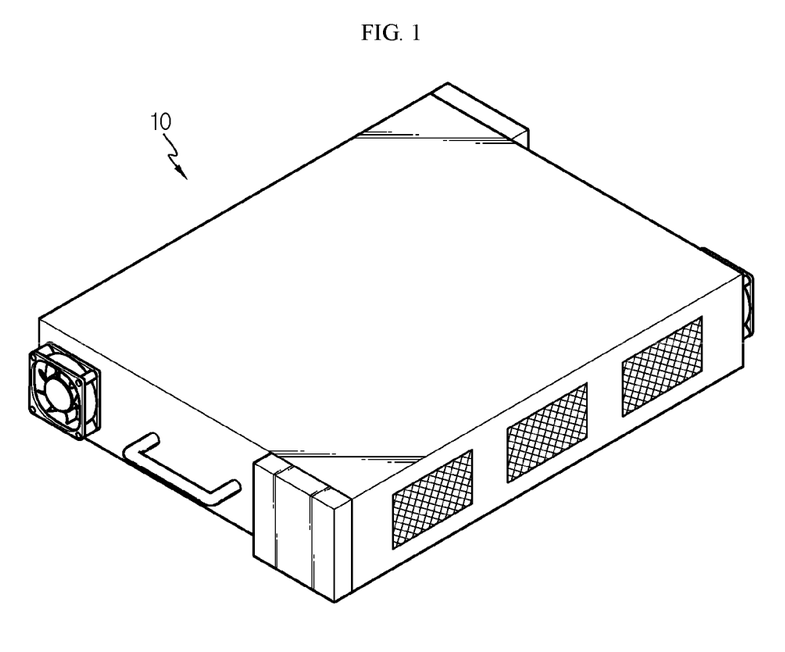
FIG. 1 is a diagram for illustrating a battery module according to an embodiment of the present disclosure.
Figure 2:
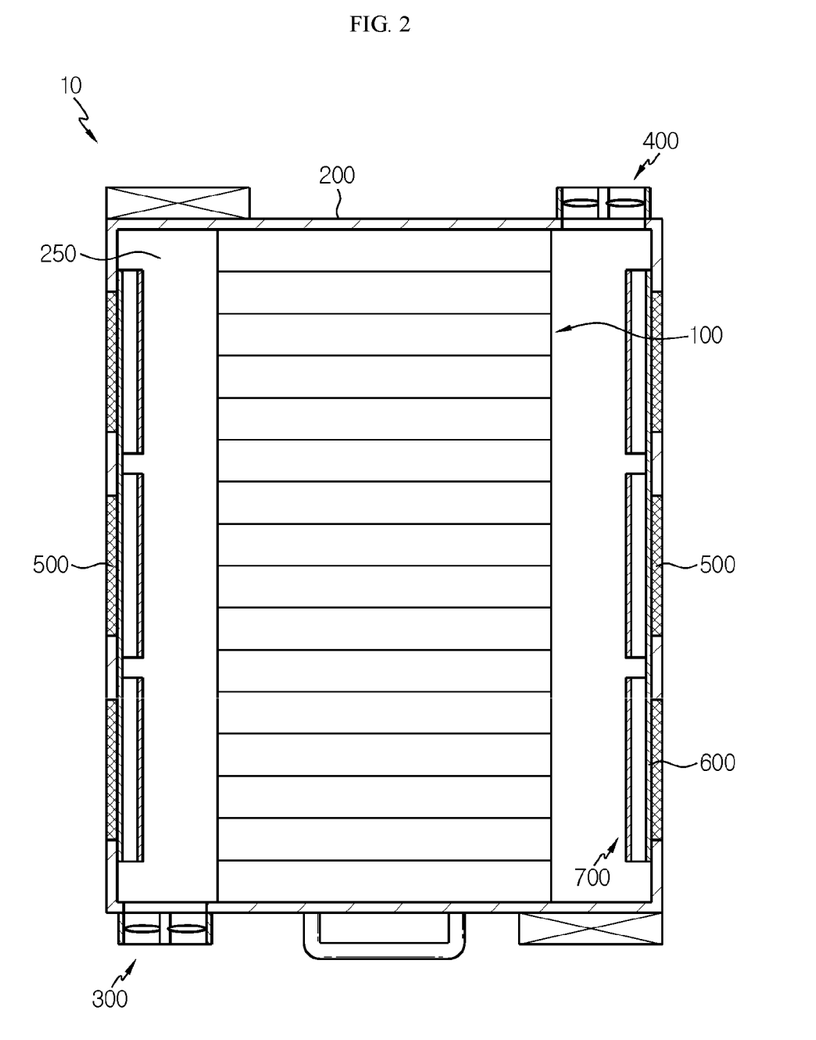
FIG. 2 is a sectional view showing the battery module of FIG. 1.
Figure 3:
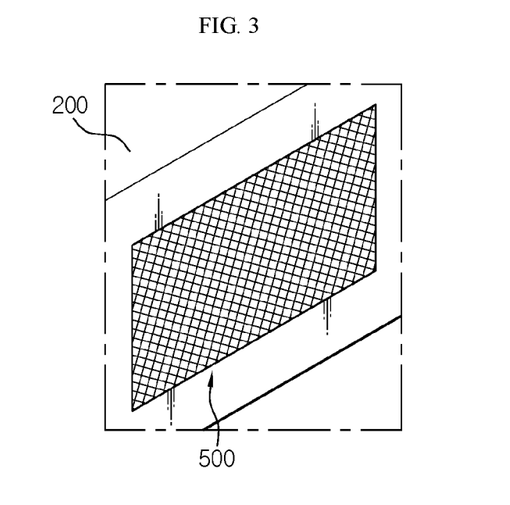
FIG. 3 is a diagram for illustrating a main part of an outer side of a module case, employed at the battery module of FIG. 1.
Figure 4:
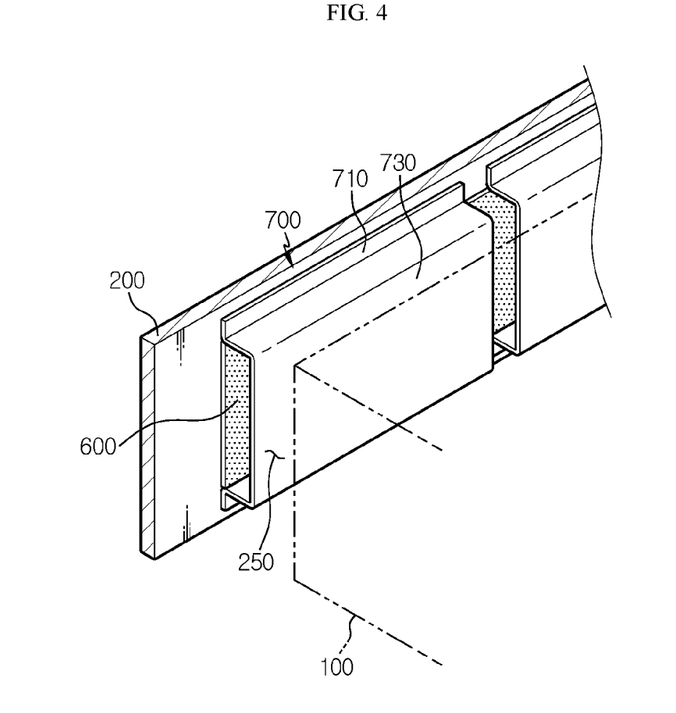
FIG. 4 is a diagram for illustrating a main part of an inner side of the module case, employed at the battery module of FIG. 1.

FIG. 1 is a diagram for illustrating a battery module according to an embodiment of the present disclosure, FIG. 2 is a sectional view showing the battery module of FIG. 1, FIG. 3 is a diagram for illustrating a main part of an outer side of a module case, employed at the battery module of FIG. 1, and FIG. 4 is a diagram for illustrating a main part of an inner side of the module case, employed at the battery module of FIG. 1.

Referring to FIGS. 1 to 4, a battery module 10 may include a battery cell 100, a module case 200, a cooling air supply unit 300, a cooling air discharge unit 400, a venting opening 500, a sheet member 600, and a blocking bracket 700.

The battery cell 100 is a secondary battery, and may be provided as a pouch-type secondary battery, a rectangular secondary battery, or a cylindrical secondary battery. Hereinafter, in this embodiment, the battery cell 100 will be described as a pouch-type secondary battery.

The battery cell 100 may be provided in plural. The plurality of battery cells 100 may be disposed to be stacked on one another so as to be electrically connected to each other.

The module case 200 may accommodate the plurality of battery cells 100. To this end, the module case 200 may have an accommodation space for accommodating the plurality of battery cells 100.

The module case 200 may include an internal cooling channel 250.

The internal cooling channel 250 may be provided at both sides of the plurality of battery cells 100 inside the module case 200. The internal cooling channel 250 may be disposed in communication with the cooling air supply unit 300 and the cooling air discharge unit 400, explained later, which are provided in an air-cooling type.

The cooling air supply unit 300 is provided at one side of the module case 200, specifically at a front side of the module case 200, and may provide a cooling air toward the internal cooling channel 250.

The cooling air supply unit 300 may include a cooling supply fan unit so that the cooling air is smoothly supplied toward the internal cooling channel 250 in the module case 200.

The cooling air discharge unit 400 is provided at the other side of the module case 200, specifically at a rear side of the module case 200, and may discharge the cooling air inside the internal cooling channel 250 to the outside of the module case 200.

The cooling air discharge unit 400 may include a cooling discharge fan unit so that the cooling air is smoothly discharged from the internal cooling channel 250 of the module case 200.

The cooling air discharge unit 400 may be disposed diagonally with respect to the cooling air supply unit 300 in a front and rear direction of the module case 200. Accordingly, the cooling air may flow more smoothly throughout the inside of the module case 200.

The venting opening 500 faces the internal cooling channel 250 of the module case 200 and may be provided at both side surfaces of the module case 200. The venting opening 500 may be provided in plural, and the plurality of venting openings 500 may be disposed to be spaced apart from each other by a predetermined distance along a longitudinal direction of the module case 200.

Here, the plurality of venting openings 500 may be provided in a mesh form. This is to prevent of flame leakage when an internal flame is generated inside the module case 200.

The sheet member 600 is provided in a pair, and the pair of sheet members 600 may be mounted at both side surfaces of the module case 200 to cover the venting opening 500. Specifically, the pair of sheet members 600 may be mounted to inner walls at both sides of the module case 200.

The pair of sheet members 600 are provided to have a predetermined length along the longitudinal direction of the module case 200, and may cover all venting openings 500 provided at each side surface of the module case 200.

The pair of sheet members 600 may be melted over a predetermined temperature to open the venting opening 500. Specifically, the pair of sheet members 600 may seal all of the at least one venting opening 500, or the plurality of venting openings 500 in this embodiment, under the predetermined temperature, and may be melted over the predetermined temperature to open at least one venting opening 500 among the plurality of venting openings 500 at least partially.

To this end, the pair of sheet members 600 may be made of a film or foam material that is susceptible to high temperatures over the predetermined temperature. The pair of sheet members 600 may be melted at a high temperature over the predetermined temperature.

The blocking bracket 700 is spaced apart from the sheet member 600 by a predetermined distance and may be mounted to the inner walls at both sides of the module case 200. The blocking bracket 700 may be provided in plural.

Each of the plurality of blocking brackets 700 may include a bracket base 710 and a bracket block 730.

The bracket base 710 may be mounted to the inner walls at both sides of the module case 200. The bracket base 710 may be fixed to the module case 200 by welding or screwing at the inner walls at both sides of the module case 200.

The bracket block 730 extends from the bracket base and may be disposed to be spaced apart from the venting opening 500 and the sheet member 600 by a predetermined distance. The bracket block 730 may be provided to have a size for covering the venting opening 500.

The bracket block 730 is disposed in the internal cooling channel 250 inside the module case 200 and may be disposed to face the plurality of battery cells 100 and the sheet member 600, respectively.

Hereinafter, the cooling state and the high-temperature condition of the battery module 10 according to this embodiment will be described in more detail.

Figure 5:
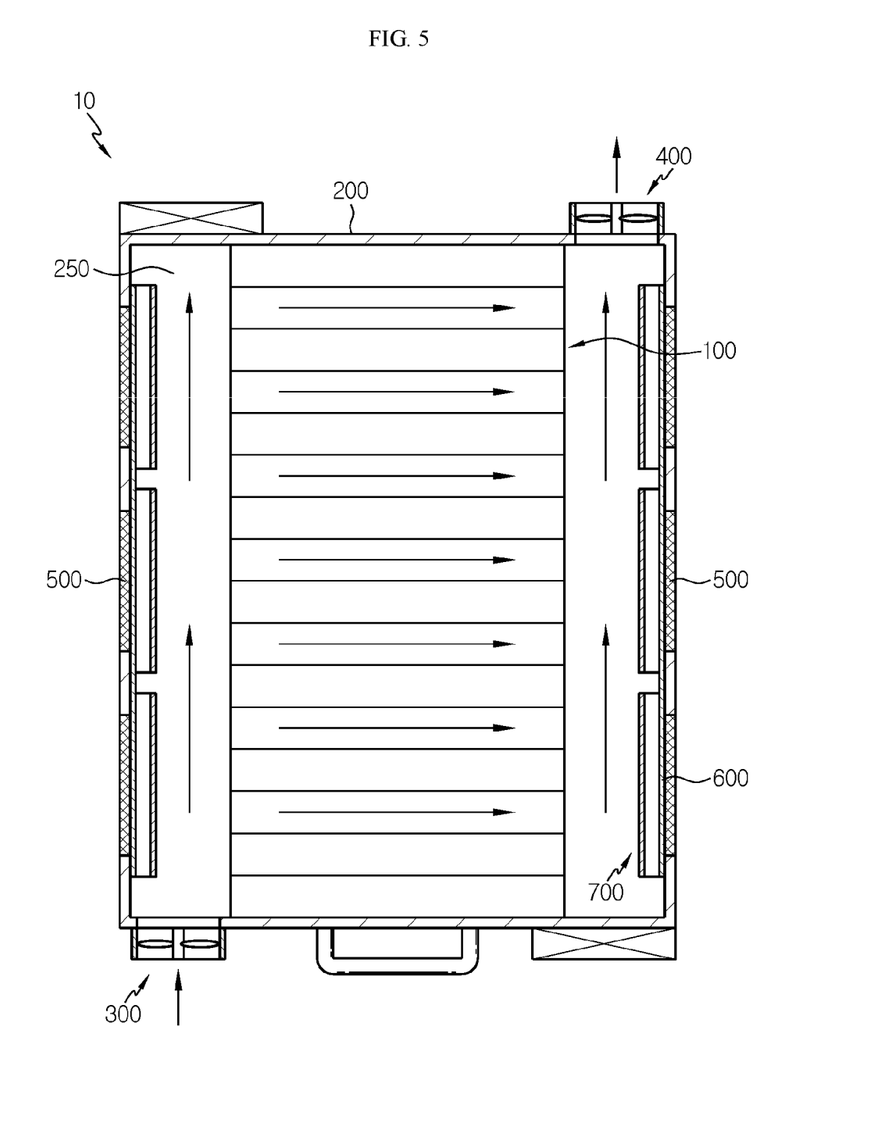
FIGS. 5 and 6 are diagrams for illustrating a state when the battery module of FIG. 1 is cooled.
Figure 6:
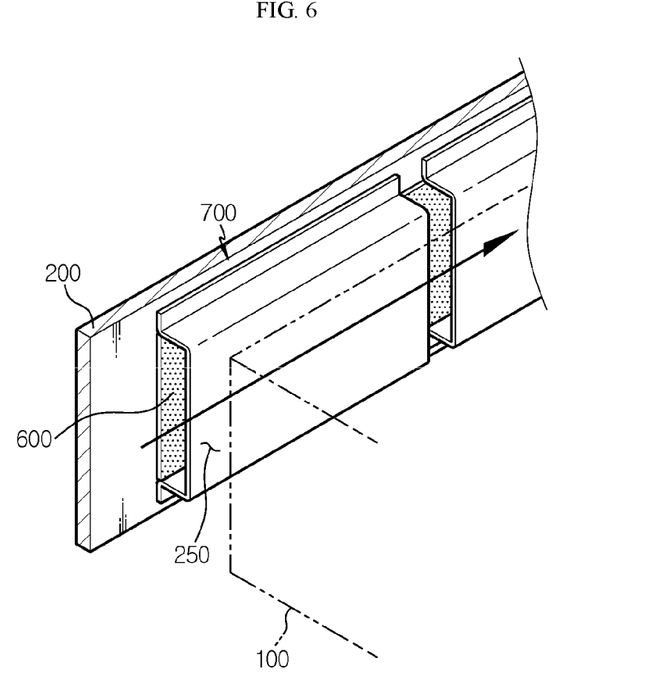

FIGS. 5 and 6 are diagrams for illustrating a state when the battery module of FIG. 1 is cooled.

Referring to FIGS. 5 and 6, when cooling the battery module 10, the cooling air supply unit 300 may introduce a cooling air for cooling the battery cells 100 from the outside of the module case 200 into the module case 200.

After that, the cooling air introduced into the module case 200 may cool the battery cells 100 while flowing through the internal cooling channel 250 of the module case 200. In this case, the cooling air may flow through a space between the sheet member 600 and the blocking bracket 700 on the internal cooling channel 250 and a space between the battery cells 100 and the blocking bracket 700. After that, the cooling air that has cooled the battery cells 100 may escape from the module case 200 through the cooling air discharge unit 400.

Figure 7:
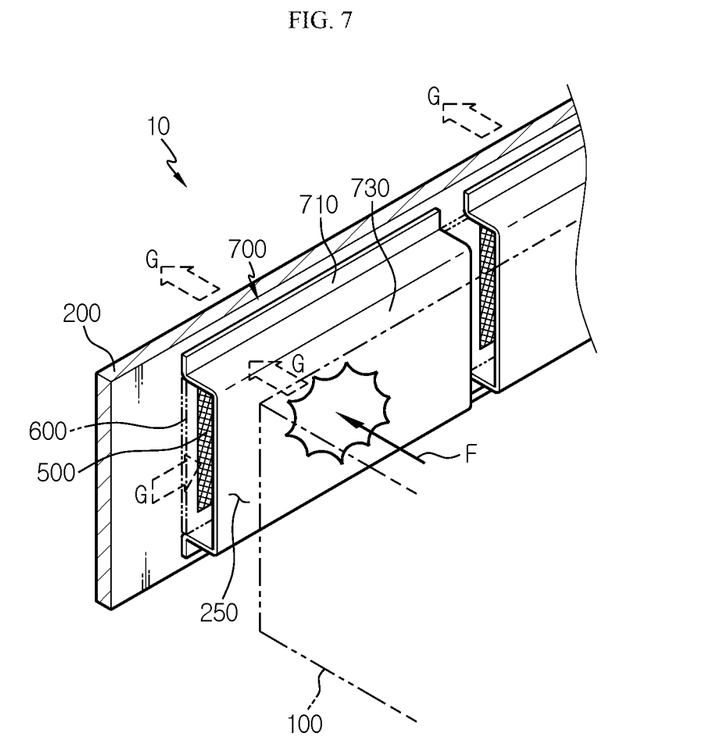
FIG. 7 is a diagram for illustrating a state when high-temperature gas and internal flame are generated due to an abnormal situation of the battery module of FIG. 1.

FIG. 7 is a diagram for illustrating a state when high-temperature gas and internal flame are generated due to an abnormal situation of the battery module of FIG. 1.

Referring to FIG. 7, in the battery module 10, abnormal heating may occur in at least one battery cell 100 among the plurality of battery cells 100. If such abnormal heating continues, a high-temperature situation may occur inside the module case 200, and high-temperature gas G and flame F may be generated inside the module case 200.

In this embodiment, when the high-temperature gas G and flame F are generated inside the module case 200 due to such a high-temperature situation, the sheet member 600 is melted so that the plurality of venting openings 500 are exposed out of the module case 200.

Accordingly, since the high-temperature gas G may be quickly discharged toward the plurality of venting openings 500, a problem in that this situation may lead to an explosion of the entire battery module 10 may be effectively blocked in advance.

Meanwhile, if the flame F is leaked out of the venting opening 500, damage may occur at the outer side of the battery module 10 due to the leaked flame F.

In this embodiment, since the blocking bracket 700 is disposed between the battery cells 100 and the venting opening 500, it is possible to effectively prevent the flame F from being leaked out of the venting opening 500, by means of the blocking bracket 700. Therefore, in this embodiment, the blocking bracket 700 may effectively prevent the external leakage of internal flame F that may occur inside the module case 200.

Figure 8:
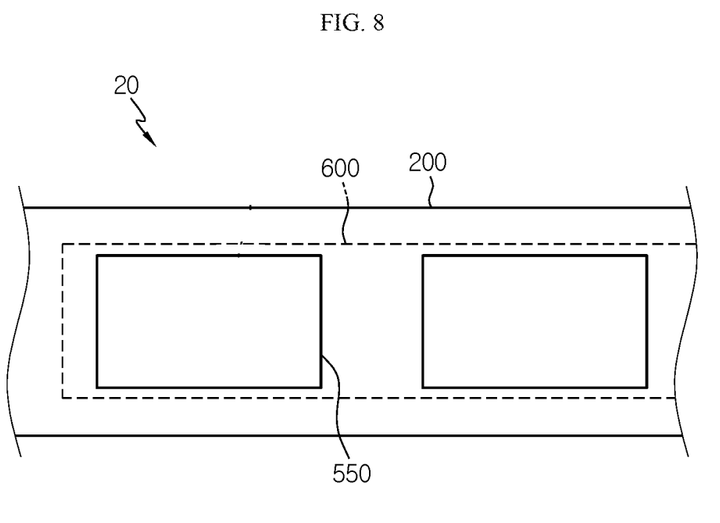
FIG. 8 is a diagram for illustrating a battery module according to another embodiment of the present disclosure.

FIG. 8 is a diagram for illustrating a battery module according to another embodiment of the present disclosure.

Since a battery module 20 of this embodiment is similar to the battery module 10 of the former embodiment, features substantially identical or similar to those of the former embodiment will not be described again, and hereinafter, features different from the former embodiment will be described in detail.

Referring to FIG. 8, the module case 200 of the battery module 20 may include a plurality of venting openings 550. The same sheet member 600 as in the former embodiment for covering the venting opening 550 may be mounted to the inner wall of the module case 200.

In this embodiment, the venting opening 550 may be provided as an opening having a predetermined size in an approximately square shape, rather than a mesh form as in the former embodiment. Accordingly, in this embodiment, in the same situation as in the former embodiment where gas is discharged, if the sheet member 600 is melted, the venting opening 550 may be opened to have a larger opening area, so that the gas may escape more quickly.

Figure 9:
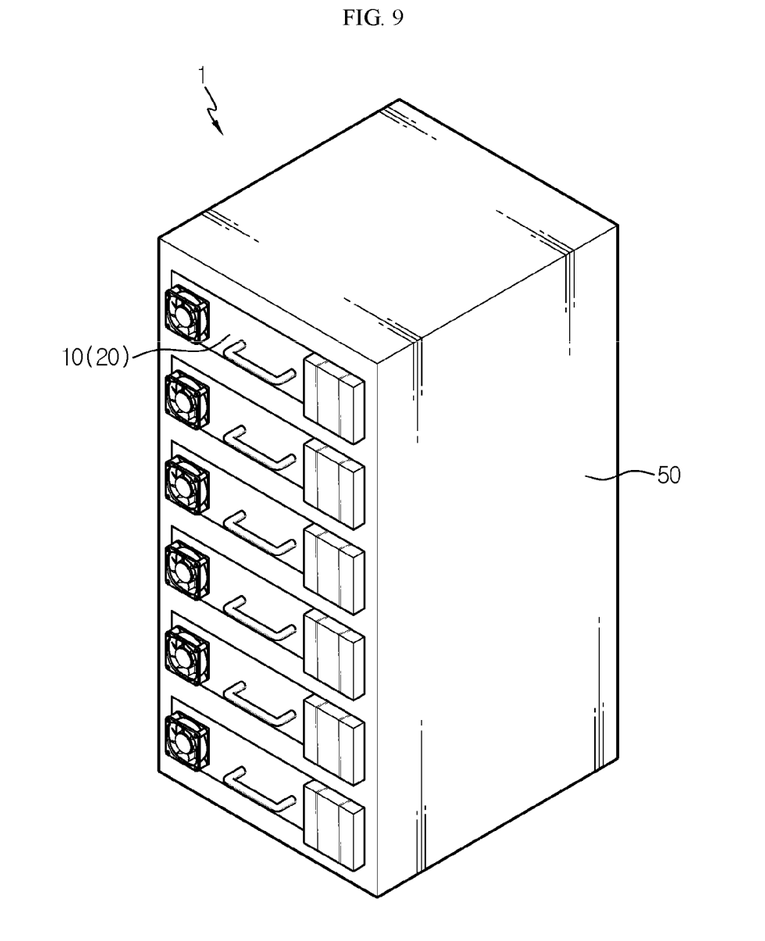
FIG. 9 is a diagram for illustrating a battery rack according to another embodiment of the present disclosure.

FIG. 9 is a diagram for illustrating a battery rack according to an embodiment of the present disclosure.

Referring to FIG. 9, a battery rack 1 may include the plurality of battery modules 10, 20 of the former embodiment, and a rack case 50 for accommodating the plurality of battery modules 10, 20.

Since the battery rack 1 of this embodiment includes the battery module 10, 20 of the former embodiment, the battery rack 1 may have all advantages of the battery module 10, 20 of the former embodiment.

Figure 10:
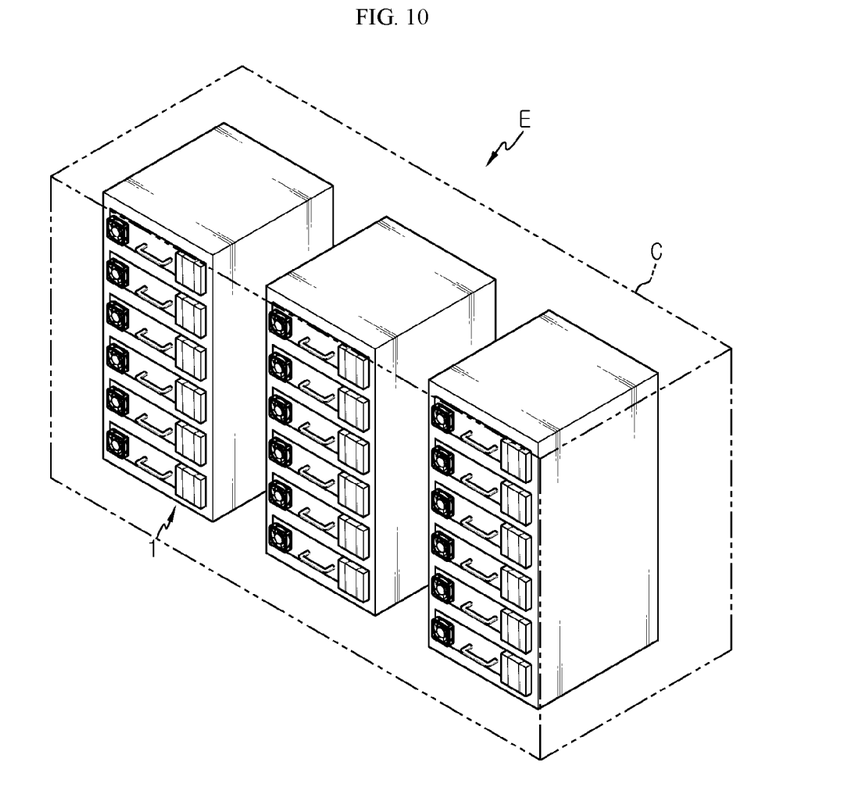
FIG. 10 is a diagram for illustrating an energy storage system according to an embodiment of the present disclosure.

FIG. 10 is a diagram for illustrating an energy storage system according to an embodiment of the present disclosure.

Referring to FIG. 10, an energy storage system E may be used for home or industries as an energy source. The energy storage system E may include at least one battery rack 1 of the former embodiment, or a plurality of battery racks 1 in this embodiment, and a rack container C for accommodating the plurality of battery racks 1.

Since the energy storage system E of this embodiment includes the battery rack 1 of the former embodiment, the energy storage system E may have all advantages of the battery rack 1 of the former embodiment.

According to various embodiments as above, it is possible to provide a battery module 10, 20, which may quickly discharge high-temperature gas to the outside when the high-temperature gas is generated in a module case 200 due to abnormal heating of at least one battery cell 100, and to provide a battery rack 1 and an energy storage system E including the battery module 10, 20.

In addition, according to various embodiments as above, it is possible to provide a battery module 10, 20, which may prevent internal flame from being leaked to the outside when the flame is generated in the module case 200 due to abnormal heating of at least one battery cell 100, and to provide a battery rack 1 and an energy storage system E including the battery module 10, 20.

While the embodiments of the present disclosure have been shown and described, it should be understood that the present disclosure is not limited to the specific embodiments described, and that various changes and modifications can be made within the scope of the present disclosure by those skilled in the art, and these modifications should not be understood individually from the technical ideas and views of the present disclosure.

What is claimed is:

1. A battery module, comprising:
   a plurality of battery cells;
   a module case configured to accommodate the plurality of battery cells and having two sidewalls and an internal cooling channel provided at each side of the plurality of battery cells;
   at least one venting opening provided in each of the two sidewalls of the module case;
   a sheet member mounted to each of the two sidewalls of the module case to cover the at least one venting opening; and
   a continuous solid blocking bracket spaced apart from the sheet member by a predetermined distance and mounted to an inner surface of each of the two sidewalls of the module case.

2. The battery module according to claim 1, wherein the at least one venting opening in each of the two sidewalls is a plurality of vent openings, and
   wherein the plurality of venting openings are disposed to be spaced apart from each other by a predetermined distance along a longitudinal direction of the module case.

3. The battery module according to claim 2, wherein the sheet member is provided to have a predetermined length along the longitudinal direction of the module case and to have a size for covering the plurality of venting openings in each of the two sidewalls of the module case.

4. The battery module according to claim 1, wherein the venting opening is a mesh.

5. The battery module according to claim 1, wherein the blocking bracket includes:
   a bracket base mounted to the inner surface of each of the two sidewalls of the module case; and
   a bracket block configured to extend from the bracket base and spaced apart from the at least one venting opening by a predetermined distance.

6. The battery module according to claim 5, wherein the bracket block is provided to have a size for covering the at least one venting opening.

7. The battery module according to claim 5, wherein the bracket block is disposed to face the plurality of battery cells.

8. The battery module according to claim 1, wherein the sheet member is mounted to the inner surface of each of the two sidewalls of the module case.

9. A battery rack, comprising:
   at least one battery module as defined in claim 1; and
   a rack case configured to accommodate the at least one battery module.

10. An energy storage system, comprising:
    at least one battery rack as defined in claim 9.

11. A battery module, comprising:
    a plurality of battery cells;
    a module case having at least two sidewalls and configured to accommodate the plurality of battery cells;
    at least one venting opening provided in the module case;
    at least one sheet member mounted to an inner surface of the module case and covering the at least one venting opening; and
    at least one continuous solid blocking bracket spaced from the inner surface of the module case and positioned between the at least one venting opening and the plurality of battery cells.

12. The battery module according to claim 11, wherein the at least one venting opening is a plurality of venting openings, and
    wherein the at least one sheet member is a single sheet member covering the plurality of venting openings.

13. The battery module according to claim 12, wherein at least one blocking bracket is a plurality of blocking brackets, and
    wherein each one of the plurality of blocking brackets covers one of the plurality of venting openings.

14. The battery module according to claim 11, wherein the at least one blocking bracket comprises a bracket base attached to the inner surface of the module case and a bracket block spaced from the inner surface of the module case.

15. The battery module according to claim 1, wherein edges of the blocking bracket are spaced from the sidewalls to create openings between the edges of the blocking bracket and a respective one of the two sidewalls.

16. The battery module according to claim 11, wherein edges of the at least one blocking bracket are spaced from the inner surface of the module case to create openings between the edges of the at least one blocking bracket and the inner surface of the module case.

17. The battery module according to claim 14, wherein edges of the bracket block are spaced from the inner surface of the module case to create openings between the edges of the bracket block and the inner surface of the module case.

* * * * *